Figure 1:
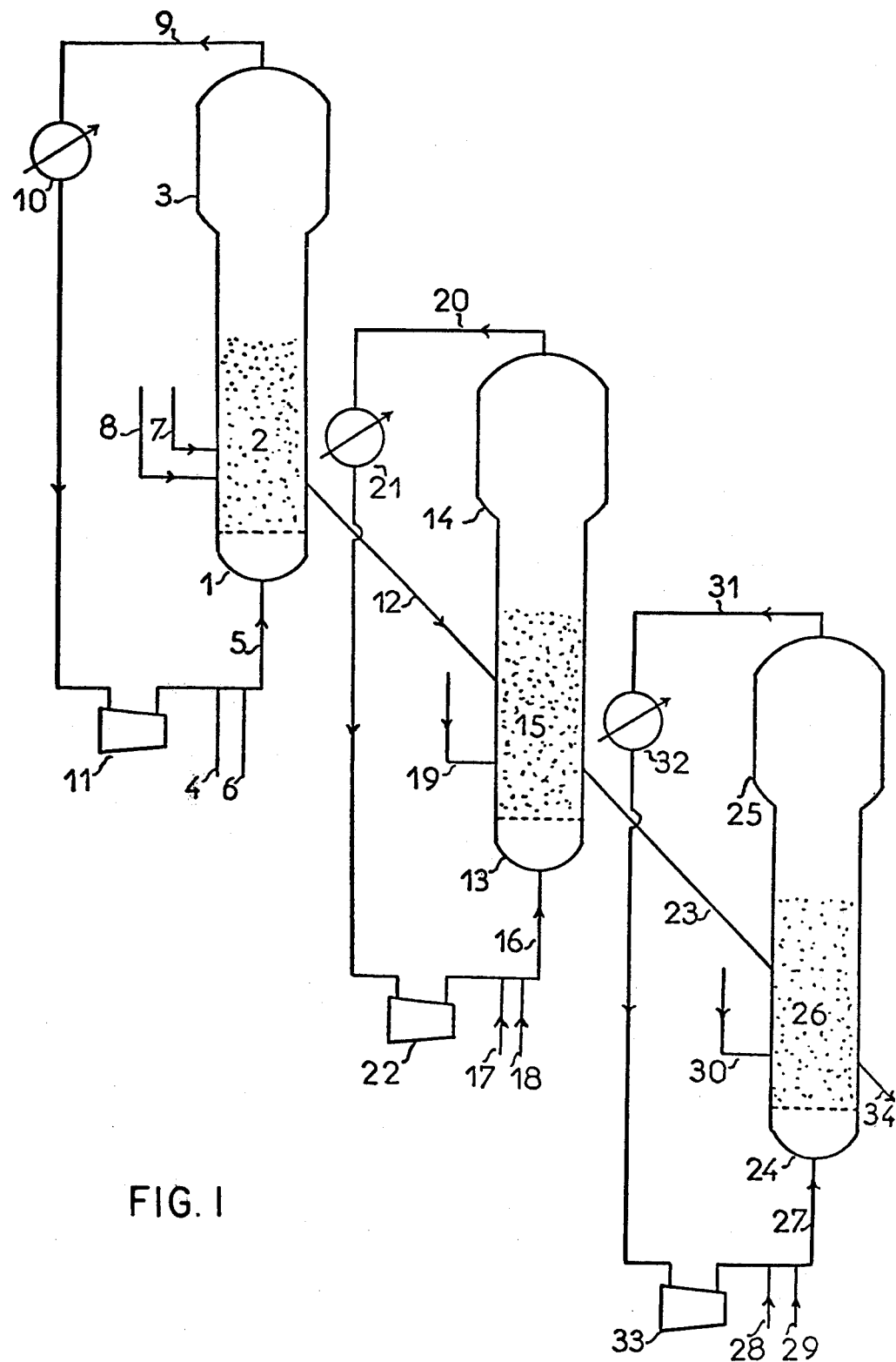

United States Patent [19]

Caumartin et al.

[11] 4,048,412

[45] Sept. 13, 1977

[54] DRY POLYMERIZATION OF OLEFINS IN REACTION VESSELS ARRANGED IN SERIES

[75] Inventors: Francois Caumartin, Martigues; Charles F. Raufast, St. Julien les Martigues; Laszlo Havas, Martigues, all of France

[73] Assignee: Naphtachimie, Paris, France

[21] Appl. No.: 688,979

[22] Filed: May 24, 1976

[30] Foreign Application Priority Data

May 27, 1975 France .................................. 75.16514

[51] Int. Cl.² .......................... C08F 2/34; C08F 10/00; C08F 297/08
[52] U.S. Cl. .................................. 526/65; 260/878 B; 526/66; 526/67; 526/68
[58] Field of Search ................. 260/878 B; 526/65, 66, 526/67, 68

[56] References Cited

U.S. PATENT DOCUMENTS

| | | | |
|---|---|---|---|
| 2,889,314 | 6/1959 | Fritz ........................................ | 526/65 |
| 3,338,986 | 8/1967 | Leibson et al. ..................... | 260/878 B |
| 3,341,622 | 9/1967 | Leibson et al. ..................... | 260/878 B |
| 3,345,431 | 10/1967 | Harban ............................... | 260/878 B |
| 3,514,501 | 5/1970 | Leibson et al. ......................... | 526/65 |
| 3,770,714 | 11/1973 | Dorschner et al. .................... | 526/65 |
| 3,776,979 | 12/1973 | Hill ................................... | 260/878 B |
| 3,922,322 | 11/1975 | Dormenval et al. ................... | 526/68 |
| 3,931,134 | 1/1976 | Hartmann et al. ...................... | 526/65 |
| 3,954,909 | 5/1976 | Havas et al. ............................ | 526/68 |

*Primary Examiner*—Alan Holler
*Attorney, Agent, or Firm*—McDougall, Hersh & Scott

[57] ABSTRACT

The dry polymerization of olefins to produce polymers having a molecular weight above 50,000 in the presence of a catalyst system formed of a compound of a transition metal and a co-catalyst of an organo-metallic compound of a metal of Groups II or III of the periodic table, in which the polymerization reaction is carried out in a series of reaction vessels wherein the formed polymer is transferred from one to the other and in which additional co-catalyst is added to reaction vessels beyond the first, the gaseous effluent from each reaction vessel is recycled back to the reaction vessel and in which the co-catalyst is introduced into the first reaction vessel in an amount such that the atomic ratio of the metal of the co-catalyst to the transition metal is within the range of 0.1 to 10, and in which the co-catalyst is introduced into vessels other than the first in an amount such that the atomic ratio of metal of the co-catalyst to the transition metal is within the range of 0.1 to 20.

13 Claims, 1 Drawing Figure

DRY POLYMERIZATION OF OLEFINS IN REACTION VESSELS ARRANGED IN SERIES

The invention relates to a method for the dry polymerization of olefins in which the olefins, in the gaseous state, are directly converted into solid polymers or copolymers having a molecular weight generally in excess of 50,000. The method of the invention can be used in particular in the polymerization of ethylene alone or mixed with other olefins.

It has previously been proposed to carry out dry polymerization of ethylene in an apparatus comprising several elementary polymerization reaction vessels which are contained in the same casing and through which the solid polyethylene passes successively during the course of its conversion. Polymerization is effected by contact with a catalyst, such as diethyl aluminum chloride mixed with titanium tetrachloride introduced in the first polymerization reaction vessel.

However, the industrial application of the abovementioned technique in fluidized bed reaction vessels leads to operational difficulties due mainly to the frequency occurrence of large agglomerates of polyethylene which are likely to cause lumping of the latter. It is in fact known that in the dry polymerization of olefins, the occurrence of agglomerates prevents the heat of polymerization from dissipating sufficiently rapidly to avoid localized over-heating resulting in inability to control the reaction. This excess heat travels rapidly and causes lumping of the polymer present in the reaction vessel. To avoid this difficulty, it has been proposed, in practice, to carry out dry polymerization of ethylene in a reaction vessel provided with mechanical means for stirring the polymer so as to prevent the formation of agglomerates.

It has been further proposed to use very active catalysts containing magnesium and transition metals in the polymerization of olefins; the use of such catalysts in the dry polymerization of olefins has further increased the difficulties in operating the process, since, in order to avoid the formation of agglomerates, their use calls for still more rapid removal of the heat of reaction.

It has now been found that, by using the improvement to which the present invention relates, it is possible to carry out dry polymerization of olefins under satisfactory industrial conditions; this improvement also offers the advantage of enabling polymers of various qualities to be readily obtained.

The invention has for its object the production of polymers having a molecular weight generally higher than 50,000, by the dry polymerization of olefins of the formula $CH_2=CHR$, in which R is a hydrogen atom or an alkyl radical having from 1 to a maximum of 8 carbon atoms, in reaction vessels in which the solid polymer, in course of its formation, is kept in the fluidized state by an upward stream of a gaseous mixture containing the olefin or olefins to be polymerized, the reaction vessels being arranged in a series in which the solid polymer, in the course of its formation, circulates successively from the first reaction vessel through to the last reaction vessel from which the polymer is discharged from the reaction vessel, polymerization being initiated by introducing into the first reaction vessel a catalyst constituted by a solid compound of a transition metal from the sub-groups Iva, Va and VIa of the periodic table, and at least one cocatalyst constituted by an organo-metallic compound of a metal from group II or III of the periodic table, which method is characterized in that:

the stream of gas issuing from each reaction vessel is recycled into the reaction vessel;

the quantity of cocatalyst introduced into the first reaction vessel is such that the atomic ratio of the metal of the cocatalyst or cocatalysts to the transition metal of the catalyst is between 0.1 to 10 and preferably between 0.1 and 1;

an additional quantity of at least one cocatalyst, identical to or different from the preceding one and constituted by an organo-metallic compound of a metal of groups II and III of the periodic table, is introduced into at least one reaction vessel other than the first reaction vessel, this quantity being such that the atomic ratio of the metal of the cocatalyst or cocatalysts present in this reaction vessel to the transition metal of the catalyst likewise present is between 0.1 and 20.

The method of the invention is preferably applied to the production of ethylene homopolymer or copolymers of ethylene and other olefins of the formula $CH_2=CHR$ mentioned above.

Representative of the transition metals from the sub-groups IVa, Va or VIa of the periodic table are titanium, vanadium, chromium, zirconium, niobium, molybdenum, hafnium, tantalum, tungsten and, by extension, thorium and uranium.

The catalyst is advantageously selected from the solid compounds of trivalent titanium of the general formula $TiX_{3-m}(OR')_m$, in which X represents a halogen atom, generally chlorine, R' an alkyl radical having 2 to 8 carbon atoms, and $m$ a whole number or a fraction, which may be of any value between 0 to 3. These trivalent titanium compounds are at present obtained by the reduction, for example by means of organo-aluminum compounds, of tetravalent titanium compounds having the formula $TiX_{4-n}(OR')_n$, in which $n$ is other than 0 and 4, may be obtained from calculated quantities of a titanium tetrahalogenide, of the formula $TiX_4$, and of an alkyl titanate, by a functional interexchange reaction which may be expressed as follows:

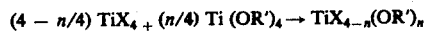

$$(4-n/4)\,TiX_4 + (n/4)\,Ti(OR')_4 \rightarrow TiX_{4-n}(OR')_n$$

The solid catalyst may also be formed of a solid compound of transition metal and of magnesium, and such compound may be obtained, for example, by a reaction between a tetravalent titanium compound and an organo-magnesium compound.

The catalyst may also be associated with a solid support constituted, for example, of silica, alumina or magnesia granulates on which the transition metal compound is deposited or fixed.

The co-catalysts used in the method of the invention are preferably in the form of organo-aluminum compounds of the general formula $AlR''_xY_{3-x}$, in which R'' represents an alkyl group having 1 to 10 carbon atoms, Y an atom of hydrogen or of a halogen, preferably chlorine, and $x$ a whole number or fraction which may have any value of from 1 to 3.

As mentioned above, the method of the invention comprises the introduction of at least two quantities of cocatalyst, on the one hand, into the first reaction vessel and, on the other hand, into at least one of the other reaction vessels. In practice, however, it is preferred to introduce a cocatalyst into each of the polymerization reaction vessels used in the method. The different quantities of cocatalyst introduced into the various reaction vessels may be the same organo-metallic compound. However, it may be advantageous to use, at least in the first reaction vessel, a cocatalyst of a kind different from that of the other cocatalysts used; thus, the use, in the first reaction vessel, of an organo-aluminum compound of relatively low molecular weight, such as triethyl aluminum, and, in the other reaction vessel or vessels, of an organo-aluminum compound of higher molecular weight, such as tri n-octyl aluminum, enables a polymer to be obtained that has a molecular distribution that is different from that obtained by the use of a single organo-aluminum compound of relatively high molecular weight. The extent of the molecular distribution mentioned above is expressed by the ratio $Mw/Mn$, in which $Mw$ designates the mean molecular mass by weight of the polymer, and $Mn$ its mean molecular mass as a number. This characteristic determines in particular the possible uses of polyolefins; thus, polyethylenes converted into finished products by extrusion generally have a $Mw/Mn$ ratio above 6, whereas polyethylenes which can be shaped by injection-molding are mainly characterized by a $Mw/Mn$ ratio below 5.

It is also possible to use, in one or more of the polymerization reaction vessels, a mixture of two or more cocatalysts such as a mixture of monochlorodiethyl aluminum and dichloromonoethyl aluminum.

The cocatalysts can be introduced into the reaction vessels in different ways. Thus, the organo-aluminum cocatalysts which are generally liquid under normal conditions of temperature and pressure can be introduced directly into the reaction vessels or into the piping through which the polymer is fed to the reaction vessel.

The cocatalysts may also be vaporized for admixture with the olefins or olefins introduced into the reaction vessels. They may also be used in the form of a powder of a polymer identical to or different from that produced by the method, said powder being previously impregnated with the co-catalyst; the impregnated powder is thereafter introduced into the reaction vessel.

The polymer present in each reaction vessel is kept in the fluidized state in an upward stream of the gaseous mixture containing the olefin or olefins to be polymerized. This upward stream preferably contains hydrogen in proportions which may be as high as 90% by volume of the gaseous mixture.

The gaseous mixture is in contact with the polymer present in the reaction vessels only during a limited period, generally less than a minute. Thus, only a fraction of the olefin or olefins introduced into the reaction vessels is polymerized therein, and it is therefore advantageous to recycle into each reaction vessel the gaseous mixture that issues therefrom. In order to prevent this gaseous mixture from entraining particles of polymer, the outlets of the reaction vessels may, for example, each be provided at the top with what is known as a tranquillization chamber having a cross-section greater than that of the corresponding reaction vessel. Thus the speed of upward travel of the gaseous mixture in this chamber is lower than in the reaction vessel, and this enables the entrained polymer particles to fall back into the reaction vessel. The entrained polymer particles may also be separated from the gaseous effluent in a cyclone and may be returned to the reaction vessel, from whence they come, and preferably to the lower part of the vessel. The polymerization of olefins is an exothermic reaction and it is necessary to remove this heat so as to maintain a relatively constant temperature in each reaction vessel. Removal of heat is preferably effected by passing the recycled gaseous mixture through a heat-exchanger located outside the reaction vessels.

In a preferred procedure for operating the method, the gaseous mixture, introduced into each reaction vessel, is constituted, on the one hand, by the gaseous mixture which is recycled from the reaction vessel or vessels and, on the other hand, by a quantity of the olefin or olefins fed to the first reaction vessel or advanced from the preceding reaction vessel, which quantity to be polymerized is introduced into the circulatory path of reaction vessels in which the reaction takes place. If required, excess hydrogen may be provided so as to replace the hydrogen consumed during polymerization or discharged with the polymer, as well as that lost as a result of any flushing that may be carried out in the circulatory path. The composition of the gaseous mixture may vary depending upon the reaction vessels. For example, it is possible to introduce into the first reaction vessel a gaseous mixture containing a relatively high proportion of hydrogen, in the order of 80% for example, and to supply the following reaction vessels with gaseous mixtures containing less hydrogen. It is also possible to use, in the various reaction vessels, different olefins or different mixtures of olefins. Thus, polymerization may be carried out using ethylene in the first reaction vessel, and using ethylene and propylene in the following reaction vessels. The reaction vessels may of course be arranged in a common enclosure if these vessels are supplied with the same gaseous mixture.

The rate of upward flow of the gaseous mixture to maintain the polymer present in each reaction vessel in the fluidized condition will depend upon the physical parameters of the polymer and the gaseous mixture, the main factors being the size of the polymer particles, the specific mass of the polymer and the viscosity and specific mass of the gaseous mixture. Generally the gases are caused to travel upwards at a flow rate of several decimeters per second.

In each reaction vessel, the temperature is kept at a level appropriate to the required rate of polymerization without however being too close to the softening temperature of the polymer. In the production of polyethylene, the temperature is generally between 30° and 115° C. It is of course possible to keep the reaction vessels at different temperatures, particularly when the polymers present in them are of different compositions. As has been mentioned above, the temperature in the reaction vessels is preferably maintained at the required level mainly by cooling the recycled gaseous mixture thereby to remove the calories produced during polymerization.

The partial pressure to which the olefin or mixture of olefins to be polymerized in the reaction vessels is subjected will depend upon the nature of these olefins as well as upon the temperature maintained in the apparatus, so as to prevent the olefins from liquefying in the coldest part of their circulatory path. In practice, this risk can only occur with olefins other than ethylene; when ethylene is used as the starting material for polymerization, temperatures are maintained at levels higher than the critical temperature for ethylene, i.e., near 10° C, the total pressure then usually being between 1 and 40 bars. It is possible to supply the various reaction vessels with gaseous mixtures, containing the olefins to be polymerized, at different partial pressures. This can be achieved by using varying proportions of a diluting gas such as hydrogen, or by using gaseous mixtures at different total pressures.

The quantity of catalyst introduced into the first reaction vessel is related to the nature of the catalyst and the co-catalysts used, as well as to the olefins to be polymerized and to such operating conditions as temperature and pressure. In practice, the quantity of catalyst introduced is adjusted during start-up of the installation so as to produce the maximum quantity of polymer having the required characteristics and containing the minimum amount of catalytic residue.

The average residence time of the forming polymer in each reaction vessel may vary over a fairly wide range which, in practice, is between 5 minutes and 10 hours. This average residence time depends to a large extent upon the temperature existing in the reaction vessel in question, as well as upon the weight of the olefins introduced into the reaction vessel during a given period of time.

The polymer, in course of formation and present in a reaction vessel, may be transferred in various ways to the next reaction vessel. In practice, this transfer is carried out while protecting the transferred material from the air in view of the sensitivity generally exhibited by catalytic systems to the action of oxygen and humidity. Advantageously, direct transfer from one reaction vessel to the next is achieved by moving the forming polymer by means of a stream of gas created by a difference in pressure between the two reaction vessels.

The polymer can be discharged from the last reaction vessel by various mechanical means. In one discharge arrangement, the lower part of this reaction vessel has an opening which can be closed and which communicates with a chamber in which a pressure lower than that of the reaction vessel exists. Uncovering of the opening during a predetermined period enables the required quantity of polymer to be introduced into this chamber. When the opening has been closed again, all that is then required is to open the chamber to enable the polymer to be removed.

Various forms of apparatus can be used. The number of reaction vessels arranged in series is often limited to two or three since it has been found that it is generally possible to achieve satisfactory operation of the apparatus with this number of reaction vessels. It is also possible to arrange a plurality of reaction vessels in parallel and to supply these from a single upstream reaction vessel. Thus, for example, a first reaction vessel can be designed to supply a plurality of secondary reaction vessels with polymer in the course of formation.

The method of the invention is preferably used in such a way that the operating conditions of the reaction vessels are substantially constant. This mode of operation can be achieved, in practice, by circulating, in the reaction vessels, gaseous mixtures having substantially the same characteristics and mainly constituted by the recycled gaseous mixture coming from the reaction vessel in question.

The method of the invention offers a number of important advantages in the production of polyolefins on an industrial scale. First, it enables the polymerization reaction vessels to function in a smooth manner without the formation of agglomerates which can cause lumping of the polymer. The method also increases the operational flexibility of the installation, since it is possible to adjust the operating conditions of each reaction vessel of the installation separately and to get the best out of each type of catalyst. The method of the invention also offers advantages as regards the properties of the products obtained. Thus, it leads to the production of polymers in powder form with the particles of quite uniform sizes. This advantage is greatly appreciated by fabricators who shape these materials and for whom fine particles constitute a danger of explosion, whereas large particles cause difficulties during shaping as well as defects in the articles produced. The method of the invention likewise makes it possible to produce polyolefins, the properties of which can be varied as required by varying the nature of the olefins and of the cocatalysts used.

An apparatus comprising three reaction vessels, as illustrated in FIG. 1, and suitable for use in carrying out the method of the invention will now be described by way of example. This apparatus comprises a first reaction vessel 1, containing at 2 the powder polymer in course of formation. The reaction vessel 1 is provided, at its upper end, with a tranquillization chamber 3. The olefin to be polymerized is introduced into the reaction vessel 1 through ducts 4 and 5; a diluting gas, such as hydrogen, is introduced through a duct 6 with the gases introduced in an amount to maintain the formed polymer in a fluidized state. The reaction vesel 1 is supplied with catalyst through a duct 7, and with co-catalyst through a duct 8. The gas, issuing from the reaction vessel 1 by way of the tranquillization chamber 3 and a duct 9, is cooled in a heat-exchanger 10 before being compressed in a compressor 11 and recycled to the reaction vessel 1 through the duct 5. Part of the polymer present in the reaction vessel 1 is transferred from vessel 1 through a duct 12 to a second reaction vessel 13, likewise provided with a tranquillization chamber 14. The polymer 15, in course of formation and present in the reaction vessel 13, is maintained in the fluidized condition by means of a stream of gas introduced into the reaction vessel 13 through a duct 16. This stream of gas is constituted, on the one hand, by the olefin to be polymerized, introduced from duct 16 and duct 17, and on the other hand, by a diluting gas, such as hydrogen, introduced through a duct 18.

The reaction vessel 13 is supplied with cocatalyst through a duct 19. The gas, issuing from the reaction vessel 13 by way of the tranquillization chamber 14 and a duct 20, is cooled in a heat-exchanger 21 and compressed in a compressor 22 and recycled to the reaction vessel 13 through the duct 16. The pressure maintained in the reaction vessel 13 is adjusted to a level lower than that of the pressure in the reaction vessel 1, so that the flow of forming polymer between the reaction vessels 1 and 13 can be achieved through the duct 12. Part of the polymer present in the reaction vessel 13 leaves the latter through a duct 23 which feeds a third reaction vessel 24, likewise provided with a tranquillization chamber 25. The polymer 26, in course of formation and present in the reaction vessel 24, is kept in the fluidized state by means of a stream of gas introduced into the reaction vessel 24 through a duct 27. This stream of gas is constituted, on the one hand, by the olefin to be polymerized, introduced into the duct 27 through a duct 28, and on the other hand, by an inert gas, such as hydrogen, introduced through a duct 29.

The reaction vessel 24 is supplied with cocatalyst through a duct 30. The gas, leaving the reaction vessel 24 through the tranquillization chamber 25 and a duct 31, is cooled in a heat-exchanger 32 before being compressed in a compressor 33 and recycled to the reaction vessel 24 through the duct 27. The pressure maintained in the reaction vessel 24 is adjusted to a level lower than that in the reaction vessel 13, so that polymer in course of formation can flow between the reaction vessels 13 and 24 through the duct 23. Polymer present in the reaction vessel 24 leaves the latter through a duct 34 which leads to outside the reaction system.

EXAMPLE 1

Use was made of apparatus such as that illustrated in FIG. 1 and consisting of three steel fluidized-bed reaction vessels, 15 cm in diameter and each provided with a tranquillization chamber. The total height of each reaction vessel was 1 meter. The fluidizing bed of each of them was made of fritted stainless steel. The speed of upward travel of the gases in the reaction vessels was 15 cm/sec. The pressure was 23 bars in the first reaction vessel and 20 and 17 bars in the following reaction vessels.

The first reaction vessel was fed with a mixture consisting of 80% by volume of hydrogen and 20% by volume of ethylene. 10 grams per hour of titanium trichloride and 11.8 grams per hour of tri n-octyl aluminum (Al/Ti atomic ratio = 0.5) were introduced into this reaction vessel. The temperature of the reaction vessel was maintained at 70° C, and the average residence time of the polymer therein was 1 hour.

The two other reaction vessels were supplied by a mixture consisting of 50% by volume of hydrogen and 50% by volume of ethylene; the temperature of these vessels was maintained at 80° C, and the average residence time of the polymer therein was 2 hours. 35.4 g/h of tri n-octyl aluminum (Al/Ti atomic ratio = 1.5) were introduced into the central reaction vessel, and 47.2 g/h of tri n-octyl aluminum (Al/Ti atomic ratio = 2) were introduced into the last reaction vessel.

77.5 kg/h of polyethylene were extracted from the last reaction vessel.

EXAMPLE 2

By way of comparison, Example 1 was repeated except that all of the tri n-octyl aluminum was introduced into the first reaction vessel, i.e., 94.4 g/h (Al/Ti atomic ratio = 4). It was not possible to obtain more than 50 kg/h of polyethylene when the apparatus was operating in a uniform manner. Furthermore, lumping was frequently observed in the first reaction vessel and this caused stoppages in operations.

EXAMPLE 3 a. Preparation of a catalyst

First, n-butyl magnesium chloride was prepared in a 5 liter stainless steel reaction vessel provided with mechanical stirring means, a reflux refrigerant and a heating or cooling means wherein a fluid was circulated in a double jacket. The following were introduced into the reaction vessel in a nitrogen atmosphere and at ambient temperature:

21.9 g (900 m. mols) of powdered magnesium,
600 ml of dry n-heptane,
83.3 g (900 m. at.g) of n-butyl chloride, and
one iodine crystal.

The reaction medium was heated to 75° C, and the reaction was started up and was continued under these conditions for 2 hours. When the reaction was complete, a suspension of 900 m. mols of n-butyl magnesium chloride in n-heptane was obtained.

Still in a nitrogen atmosphere, the suspension of n-butyl magnesium chloride was heated to 75° C. Over a period of 2 hours a solution of 57 g (300 m. mols) of titanium tetrachloride and 83.3 g (900 m. mols) of n-butyl chloride in 350 ml of n-heptane was gradually introduced by means of a metering pump. After introduction of the solution was completed, the reaction medium was maintained at 75° C for 1 hour, with stirring.

The brown-black precipitate obtained was washed several times with n-heptane. The composition of the dry catalyst was as follows (% by weight): Ti : 8.3 — Mg : 18.2 — Cl : 73.5.

b. Polymerization of ethylene

The same apparatus as in Example 1 was used, and the same values for temperatures, composition of the gases and the rate of flow thereof were maintained.

65 g/h of the catalyst, prepared in the manner described above, and 11.8 g/h of tri n-octyl aluminum (Al/Ti atomic ratio = 0.5) were introduced into the first reaction vessel, and 47.2 g/h of tri n-octyl aluminum (Al/Ti atomic ratio = 2) were introduced into the central reaction vessel.

160 kg/h of a polyethylene, of which the extent of the molecular distribution, measured by gel permeation chromatograph (G.P.C.) was 4, were extracted from the last reaction vessel.

EXAMPLE 4

The same procedure as in Example 3 was used, but the tri n-octyl aluminum, introduced into the first reaction vessel, was replaced by 3.7 g/l of triethyl aluminum (Al/Ti atomic ratio = 0.5). The polymer obtained had a molecular distribution extent of 6.

EXAMPLE 5

The same procedure as in Example 1 was used but with the following modifications:

the titanium trichloride, introduced into the first reaction vessel, was replaced by 65 g/h of the catalyst prepared in the manner described in Example 3a.

the gaseous mixture introduced into the central reaction vessel and the last reaction vessel was made up to 4% by volume of propylene, 48% by volume of ethylene and 48% by volume of hydrogen.

200 kg/h of a copolymer, containing 1.5% by weight of propylene units, were extracted from the last reaction vessel.

We claim:

1. A method of producing polymers having a molecular weight generally higher than 50,000, by the dry polymerization of olefins of the formula $CH_2 = CHR$, in which R is selected from the group consisting of a hydrogen atom and an alkyl radical having from 1 to 8 carbon atoms, in reaction vessels in which the solid polymer in course of formation is kept in the fluidized state by an upward stream of a gaseous mixture containing the olefin or olefins to be polymerized, the reaction vessels being arranged in a series in which the solid polymer in course of formation flows successively from the first reaction vessel through to the last reaction vessel from which the polymer is discharged while a separate recycle is maintained for each reaction vessel with respect to the gaseous mixture of olefin or olefins whereby the said gaseous mixture issuing from one reaction vessel is recycled for reintroduction into the same reaction vessel, polymerization being initiated by introducing into the first reaction vessel a catalyst comprising a solid compound of a transition metal from the subgroups IVa, Va and VIa of the periodic table, and at least one cocatalyst comprising an organo-metallic compound of a metal from group II or III of the periodic table, introducing cocatalyst into the first reaction vessel in an amount such that the atomic ratio of the metal of the co-catalyst or cocatalysts to the transition metal of the catalyst is between 0.1 to 10, and introducing an additional quantity of at least one cocatalyst into at least one of the reaction vessels other than the first.

2. A method as claimed in claim 1 in which the cocatalyst introduced into the reaction vessels other than the first is the same or different than the cocatalyst introduced into the first reaction vessel.

3. A method as claimed in claim 1 which includes the step of passing the gaseous mixture issuing from a reaction vessel through a heat exchanger for removal of heat of polymerization before recycling back to the reaction vessel.

4. A method as claimed in claim 1 in which the catalyst comprises a solid compound of trivalent titanium having the general formula $TiX_{(3-m)}(OR')_m$, in which X represents a halogen atom, R' an alkyl radical having from 2 to 8 carbon atoms, and m is a whole number or fraction of from 0 to 3.

5. A method as claimed in claim 4 in which the halogen is chlorine.

6. A method as claimed in claim 1 in which the catalyst comprises a solid compound of magnesium and a transition metal.

7. A method as claimed in claim 6 in which the transition metal is titanium.

8. A method as claimed in claim 1 in which the cocatalyst or co-catalysts introduced into the first reaction vessel differs from the cocatalyst or cocatalysts introduced in others of the reaction vessels.

9. A method as claimed in claim 1 in which the cocatalyst or cocatalysts comprise organo-aluminum compounds having the general formula $AlR''_x Y_{3-x}$, in which R'' represents an alkyl group having from 1 to 20 carbon atoms, Y is an atom selected from the group consisting of hydrogen and a halogen, and x is a whole number or fraction of from 1 to 3.

10. A method as claimed in claim 9 in which the halogen is chlorine.

11. A method as claimed in claim 1 in which the olefin is mainly ethylene and the polymerization is carried out starting with a gaseous mixture containing up to 90% by volume hydrogen, the pressure being within the range of 1 to 40 bars and the temperature being within the range of 30° to 115° C.

12. Olefins polymers and copolymers having a molecular weight greater than 50,000 produced by the method of claim 1.

13. A method as claimed in claim 1 which includes the step of introducing additional olefin or olefins for admixture with the olefin or olefins recycled for reintroduction into the reaction vessel.

* * * * *